United States Patent Office 3,081,178
Patented Mar. 12, 1963

3,081,178
OPTICAL BORATE GLASS
Gustav Weissenberg and Otto Ungemach, Marburg (Lahn), Germany, assignors to Ernst Leitz, G.m.b.H., Wetzlar (Lahn), Germany, a corporation of Germany
Filed Aug. 10, 1959, Ser. No. 832,594
6 Claims. (Cl. 106—47)

The present application is a continuation-in-part of our co-pending application Ser. No. 271,804, filed February 15, 1952, and now abandoned.

The above invention relates to practically fluorine free optical borate glasses which are free from toxic and radioactive crude materials. The glasses exhibit a high index of refraction with a relatively low dispersion.

Glasses of similar optical bases are known in the art. However besides oxides of the rare earths, particularly lanthanum oxide they contain almost always thorium oxide, which is of only limited usefulness because of its radioactivity. Other known glasses contain beryllium oxide which is exceptionally toxic. Their preparation and working requires very expensive special protective measures whose action is still very problematical.

The glasses of our invention are characterized in that:

First, they consist of at least 80% of a glass base of boric oxide, lanthanum oxide and at least one oxide of the alkaline earth metals, magnesium, calcium, strontium and barium in which the mol ratio of the oxide of the alkaline earth metals to boric oxide lies between 0.2 and 1, and the mol ratio of lanthanum oxide to boric oxide lies between 0.1 and 0.5.

Secondly, they contain from 0 to 20% by weight of at least one oxide of the elements of the group consisting of germanium, tin, zirconium and tantalum, as also Thirdly, they contain from 0 to 5% by weight of silica and aluminum oxide. The lanthanum oxide can, in accordance with the invention, be substituted in part by at least one oxide of the elements of the group consisting of indium and yttrium.

The amount of germanium oxide can amount up to 10% by weight, the amount of zirconium oxide up to 20% by weight, the amount of tin oxide up to 5% by weight and the amount of tantalum oxide up to 20% by weight.

The alkaline earth elements can be introduced into the mixture to be melted down as oxides or in the form of such compounds as change in the melt to oxides as, for example, carbonate, nitrate and the like. In this it is noted that the melting temperature and duration of melting will be so selected that by way of example in the use of carbonates the carbon dioxide is driven out quantitatively. The alkaline earth metals can also be introduced into the melt charge as fluorides if, at the same time an increased amount of boric oxide is introduced which exceeds the limits given above for the mol ratio. The required addition of boric oxide is determined by calculating the additional amount of boric oxide required to combine with the fluorides present to form boron trifluoride. The melting process is then also so conducted regarding the melting temperature and the time of melting that the fluorine originally present will be practically quantitatively driven out of the melt as boron trifluoride. In this care is to be taken that, always according to the alkaline earth metal compound used, the time varies for practically quantitative driving off of the fluorine. With the aid of easily accomplished tests which can be withdrawn from the melting material, the remaining portion of the fluorine present is determined according to known chemical methods.

The glasses are meltable at temperatures of about 1300° C. For refining the temperature is increased to 1350–1450° C. The casting temperature for the glasses of the invention lies between 1000° C. and 1100° C. Cooling down and temperature conditions for the glasses are ascertained in accordance with known methods for the preparation of optical glasses. In occasional situations it is suitable for reducing the melting down temperature to add cryolite as a flux in an amount up to 2% by weight of the melting charge.

In FIGS. 1 to 4 of the accompanying drawings are shown, in the three coordinate diagrams, the boric oxide-lanthanum oxide-alkaline earth oxide in percent by weight of the glass base in the range in which they are found in the glass formation of our invention. In these drawings:

Figure 1:
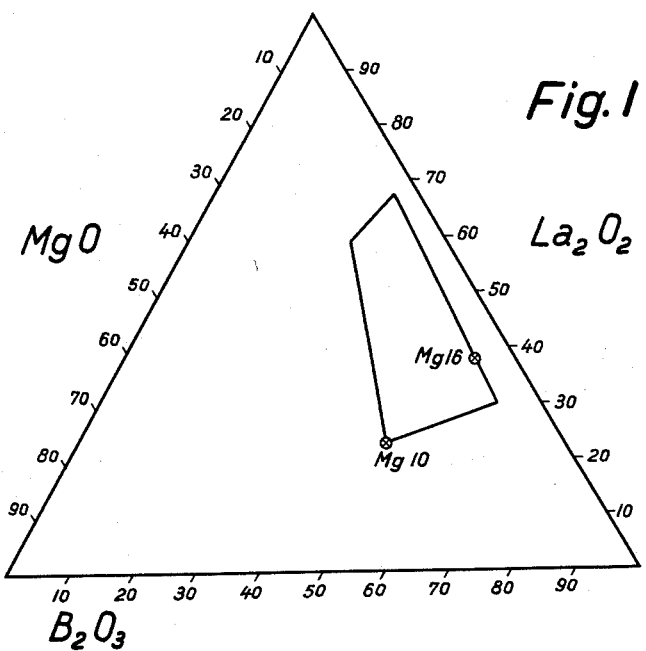
FIG. 1 shows the glass is which the alkaline earth oxide is magnesium oxide.
Figure 2:
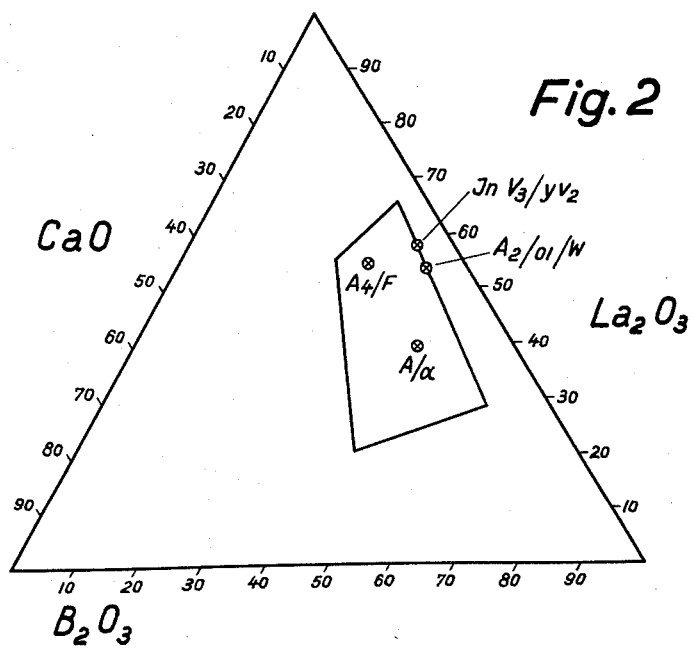
FIG. 2 shows the glass in which the alkaline earth oxide is calcium oxide.
Figure 3:
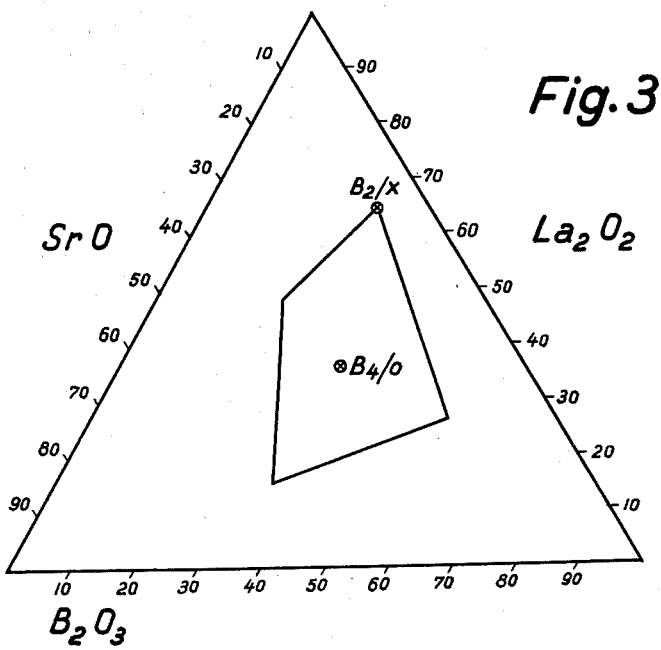
FIG. 3 shows the glass in which the alkaline earth is strontium oxide.
Figure 4:
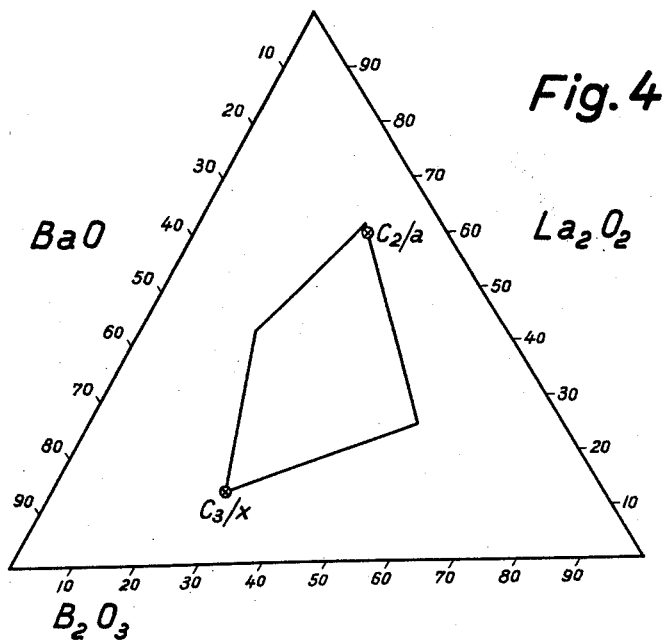
FIG. 4 shows the glass in which the alkaline earth oxide is barium oxide.

These ranges are recalculated from the above stated mol ratios $$\frac{\text{Alkaline earth oxide}}{B_2O_3}=0.2-1 \text{ and } \frac{La_2O_3}{B_2O_3}=0.1-0.5$$

to percent by weight. Within these ranges a large number of valuable glasses will be melted. The completion of a small number of these glasses is shown in the following tables.

In Table 1 are given examples which consist in part only of the glass base and in part of the glass base and the additives given above. The data of the table are in percent by weight. In two particular cases the mol ratio of alkaline earth oxide: boric oxide and lanthanum oxide: boric oxide respectively are additionally given.

Table 2 shows some examples in which the lanthanum oxide is substituted in part by indium oxide and yttrium oxide.

Table 1

| Melt No. | Percent by weight | | | | | | Mol ratio | | $n_e$ | $v_e$ | Glass base, percent |
|---|---|---|---|---|---|---|---|---|---|---|---|
| | | | | | | | MeO / $B_2O_3$ | $La_2O_3$ / $B_2O_3$ | | | |
| | $B_2O_3$ | $La_2O_3$ | CaO | $ZrO_2$ | $Ta_2O_5$ | | | | | | |
| A2/01/W | 40.0 | 53.6 | 6.4 | | | | 0.200 | 0.288 | 1.723 | 54.3 | 100 |
| A | 37.5 | 33.3 | 12.5 | 4.2 | 12.5 | | 0.415 | 0.190 | 1.731 | 49.9 | 83 |

| Melt No. | Percent by weight | | | | | | Mol ratio | | $n_e$ | $v_e$ | Glass base, percent |
|---|---|---|---|---|---|---|---|---|---|---|---|
| | | | | | | | MeO / $B_2O_3$ | $La_2O_3$ / $B_2O_3$ | | | |
| | $B_2O_3$ | $La_2O_3$ | SrO | $SiO_2$ | $SnO_2$ | $Ta_2O_5$ | | | | | |
| B4/0 | 35.1 | 36.4 | 28.5 | | | | 0.548 | 0.224 | 1.709 | 53.3 | 100 |
| B2/X | 22.5 | 52.5 | 6.7 | 4.1 | 4.1 | 10.1 | 0.200 | 0.500 | 1.789 | 47.3 | 81.7 |

| Melt No. | Percent by weight | | | | | | Mol ratio | | $n_e$ | $v_e$ | Glass base, percent |
|---|---|---|---|---|---|---|---|---|---|---|---|
| | | | | | | | MeO / $B_2O_3$ | $La_2O_3$ / $B_2O_3$ | | | |
| | $B_2O_3$ | $La_2O_3$ | BaO | $SiO_2$ | $GeO_2$ | $Ta_2O_5$ | | | | | |
| C2/a | 23.1 | 50.5 | 10.1 | 2.5 | 6.9 | 6.9 | 0.200 | 0.470 | 1.774 | 48.6 | 83.7 |

| Melt No. | Percent by weight | | | | | | Mol ratio | | $n_e$ | $v_e$ | Glass base, percent |
|---|---|---|---|---|---|---|---|---|---|---|---|
| | | | | | | | MeO / $B_2O_3$ | $La_2O_3$ / $B_2O_3$ | | | |
| | $B_2O_3$ | $La_2O_3$ | MgO | $SiO_2$ | $GeO_2$ | $ZrO_2$ | | | | | |
| Mg16 | 45.9 | 31.6 | 5.8 | | | 16.7 | 0.221 | 0.148 | 1.717 | 49.7 | 83.3 |

Table 2

| Melt No. | Percent by weight | | | | | | Mol ratio | | $n_e$ | $v_e$ | Glass base, percent |
|---|---|---|---|---|---|---|---|---|---|---|---|
| | | | | | | | MeO / $B_2O_3$ | $La_2O_3$ / $B_2O_3$ | | | |
| | $B_2O_3$ | $La_2O_3$ | $Y_2O_3$ | CaO | $SiO_2$ | $ZrO_2$ | | | | | |
| YV2 | 32.3 | 40.3 | 12.2 | 5.2 | 5.0 | 5.0 | 0.201 | 0.385 | 1.715 | 53.3 | 90 |

| Melt No. | Percent by weight | | | | | | Mol ratio | | $n_e$ | $v_e$ | Glass base, percent |
|---|---|---|---|---|---|---|---|---|---|---|---|
| | | | | | | | MeO / $B_2O_3$ | $La_2O$ / $B_2O_3$ | | | |
| | $B_2O_3$ | $La_2O_3$ | $In_2O_3$ | CaO | $SiO_2$ | $ZrO_2$ | | | | | |
| InV3 | 32.3 | 40.3 | 12.2 | 5.2 | 5.0 | 5.0 | 0.201 | 0.364 | 1.705 | 51.3 | 90 |

Having described our invention, what we claim is:

1. Optical glass having an index of refraction ($n_e$) above 1.7 and an Abbé number above 47 and consisting essentially of
   (1) at least 80% by weight of a mixture of boric oxide, lanthanum oxide and at least one oxide of the group of alkaline earth metals consisting of magnesium, calcium, strontium and barium, in which the mol ratio of the alkaline earth metal oxide to the boric oxide is between 0.2 and 1 and the mol ratio of the lanthanum oxide to the boric oxide is between 0.148 and 0.5;
   (2) of 0 to 20% by weight of at least one oxide of the elements consisting of germanium, tin, zirconium and tantalum;
   (3) of 0 to 5% by weight of the group consisting of silica and aluminum oxide.
2. Optical glass of claim 1 in which the lanthanum oxide is substituted at least in part by at least one oxide of elements of the group consisting of yttrium and indium.
3. Optical glass of claim 1 germanium oxide in amount to from 0 to 10% by weight.
4. Optical glass of claim 1 zirconium oxide in amount to from 0 to 20% by weight.
5. Optical glass of claim 1 tin oxide in amount to from 0 to 5% by weight.
6. Optical glass of claim 1 tantalum oxide in amount to from 0 to 20% by weight.

References Cited in the file of this patent

UNITED STATES PATENTS

| Re. 21,175 | Morey | Aug. 15, 1939 |
| 2,466,510 | Sun et al. | Apr. 5, 1949 |

FOREIGN PATENTS

| 462,304 | Great Britain | Mar. 3, 1937 |
| 608,298 | Great Britain | Sept. 13, 1948 |